B. H. & M. PAUL.
MACHINE FOR SEEDING FRUIT.
APPLICATION FILED MAY 24, 1909.
943,955.
Patented Dec. 21, 1909.
2 SHEETS—SHEET 1.
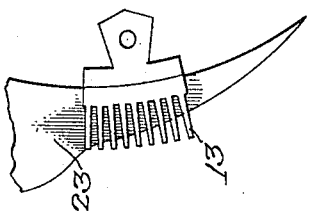
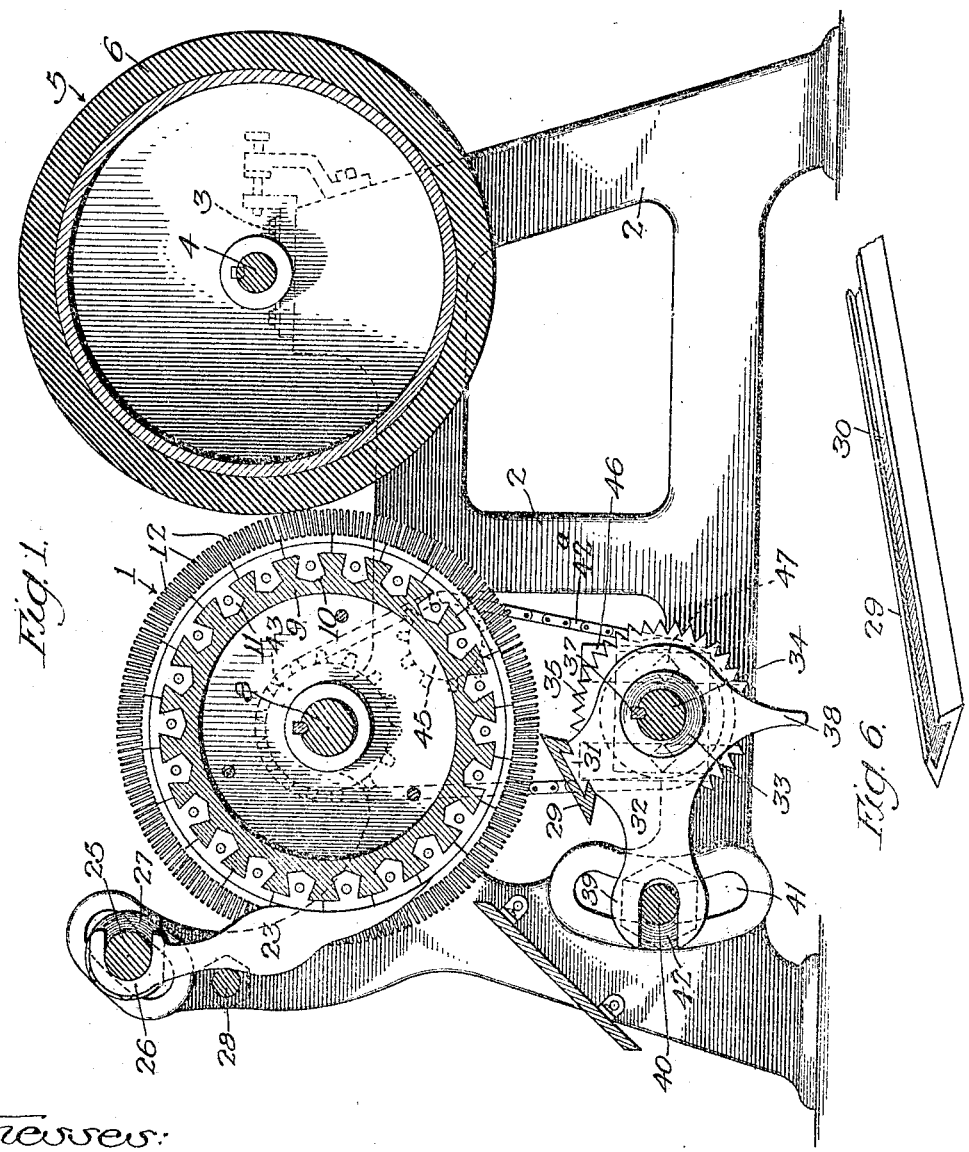
Witnesses:
Inventors:
Basil H. Paul
Madeleine Paul
By Brooks & Lidders
Attorneys

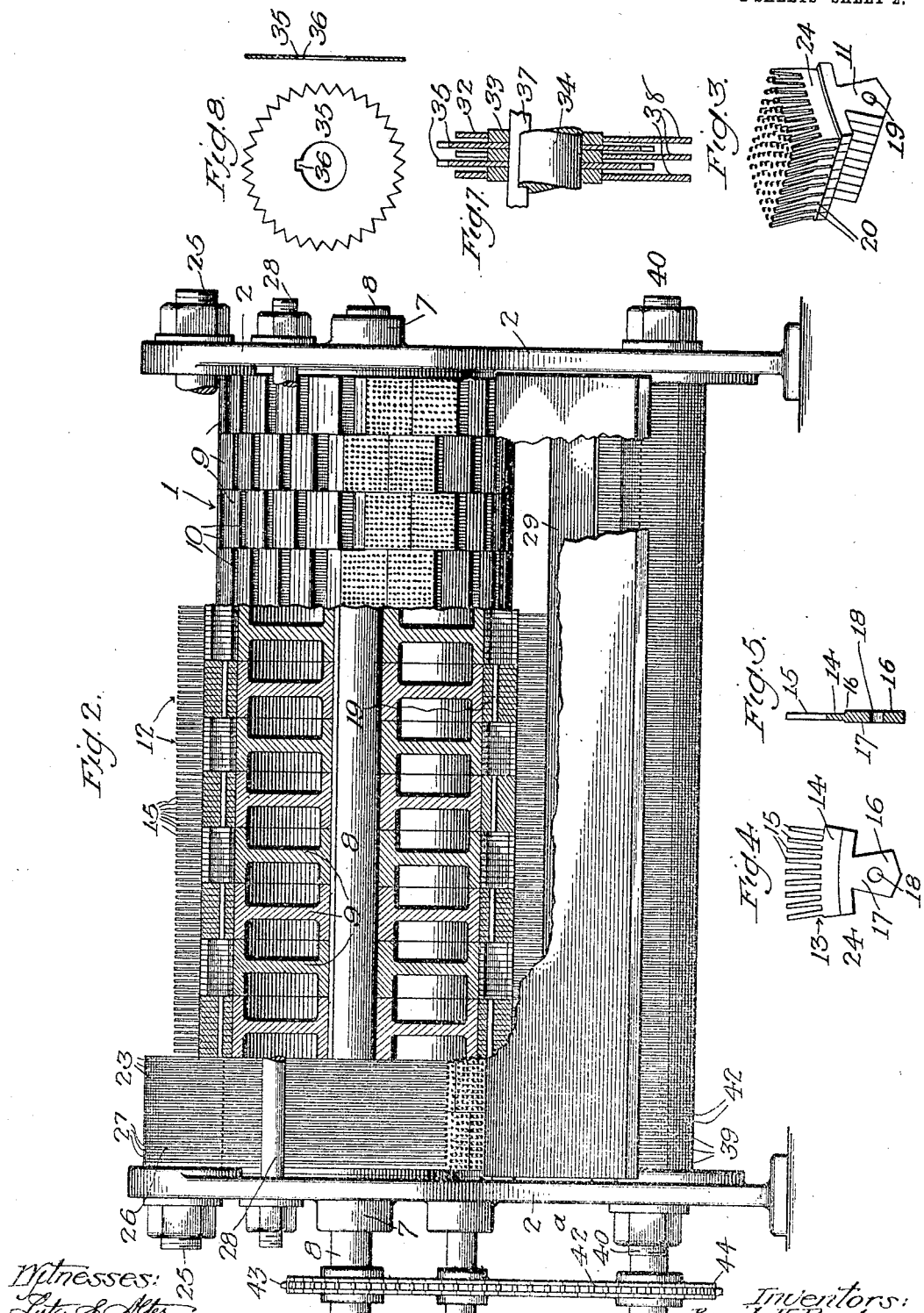

UNITED STATES PATENT OFFICE.

BASIL H. PAUL AND MADELEINE PAUL, OF LOS ANGELES, CALIFORNIA.

MACHINE FOR SEEDING FRUIT.

943,955.          Specification of Letters Patent.   Patented Dec. 21, 1909.

Application filed May 24, 1909. Serial No. 498,071.

*To all whom it may concern:*

Be it known that we, BASIL H. PAUL and MADELEINE PAUL, citizens of the United States of America, both residing at Los Angeles, county of Los Angeles, State of California, have invented a certain new and useful Machine for Seeding Fruit; and we do hereby declare the following to be a full, clear, and exact description of the invention, such as will enable others skilled in the art to which it appertains to make and use the same.

This invention relates to a machine for seeding fruit, particularly fruit in a dried condition, such as raisins, currents, etc. In machines of this class, in order to avoid undue tearing of the skin of the fruit and waste of the pulp, it is essential that the impaling means be provided with comparatively slender teeth or pins, consequently when any hard, unyielding substance enters the machine these teeth are damaged and need to be replaced.

It is an object of the invention to provide a built up construction for the impaling means, comprising a plurality of comparatively small units which may be composed of still smaller elements to the end that any damaged elements may be readily replaceable.

Another object of the invention is to provide a construction wherein the impaling units are prevented from appreciable movement, particularly in a direction longitudinally of the drum.

Further objects of the invention are to provide a construction in which the teeth of contiguous impaling units will be spaced the same distance as the teeth of individual impaling units; to provide means for removing accumulations from the seed stripping knife; to provide a seed stripping knife which may be adjusted in position circumferentially of the drum carrying the impaling means; to provide a multiple-edge seed stripping knife.

Other objects and the advantages of the invention will be apparent to those skilled in the art from the following description of one form of construction embodying it, when taken in connection with the accompanying drawings, in which—

Figure 1 is a central section transversely of the drum carrying the impaling means; Fig. 2 is a front elevation partly broken away; Fig. 3 is a perspective of one of the impaling units, and Fig. 4 is a side elevation of one of the elements comprising the same, and Fig. 5 is a section through the latter; Fig. 6 is a perspective of the seed stripping knife; Fig. 7 is a section through the means for removing accumulations of material from the seed stripping knife; Fig. 8 is an elevation and a section of one of the seed strippers; and Fig. 9 is a side view of an impaling element associated with a fruit stripper.

The frame 2 of the machine has near its upper part bearings 3 in which is supported shaft 4 carrying a cylinder 5 having a covering 6 of yielding material. In bearings 7, also on the upper part of frame 2, is mounted shaft 8 upon which is arranged a drum 1 comprising a plurality of members 9 placed together in parallel on the shaft, each having in its periphery dovetail grooves 10; the shaft 8 may be driven from any suitable source of power (not shown). Into each of the grooves 10 may be inserted the dovetail 11 of an impaling unit or block 12 (Fig. 3), the latter, preferably, being made up of a plurality of elements 13 (Figs. 4 and 5) joined together to form a block. These elements may each consist of a thin portion 14 provided with teeth 15, and an integral thicker portion 16 offset from the walls 24 of the elements at a short distance below the bottom of the teeth 15. When the offsets are made on each side of the elements, as shown in the drawing, they are equal in width to substantially one-half of the spaces between the teeth. Each element is also extended beyond the end teeth thereon, a distance equal to substantially one-half the distance between the teeth. The thicker portion 16 of each element may be provided with a dovetail 17 and may have a hole through which a rivet 19 may pass to join the elements together to form the impaling unit 12. By the construction of the elements as just described, the assembled units have an extension on four of their surfaces equal to one-half the space between teeth, consequently when the units are placed in position on the drum 1, the teeth are equidistantly spaced, with intervening circumferential grooves 20 below the bottoms of the teeth. In assembling the drum, the dovetail grooves in the adjacent members 9 are preferably staggered so that the individual impaling units 12 are restricted in their longitudinal movement by the portions between the grooves 10 of the abutting members. In the grooves 20 are disposed the end portions of fruit strippers 23. The walls 24 of the grooves 20 are designed to furnish guides for the end portions of the fruit strippers 23. Fruit strippers 23 may be secured to the frame in any approved manner, that shown comprising a rod 25 upon which the bifurcated ends 26 of the strippers are placed, washers 27 being interposed therebetween. A bar 28 is disposed at the back of the strippers to prevent their being displaced outwardly from the drum.

The seed stripping knife 29 is supported longitudinally of the drum by dovetail channel 30 therein, the sides of which embrace dovetails 31 formed on strippers 32. The strippers 32 are supported at one end upon washers 33 which turn freely in holes therein and are mounted upon shaft 34. Alternating with the strippers and washers on shaft 34 are toothed disks 35 (Figs. 7 and 8), each having a keyway 36 fitting over a feather 37 upon shaft 34. The strippers 32 are provided with a part 38 extending beyond the teeth of disks 35, whereby any material carried by the disks is dislodged therefrom. The bifurcated ends 39 of strippers 32 remote from shaft 34 straddle a rod 40, the ends of which are adjustably disposed in a slot 41 in frame 2. Washers 42 are alternated with the ends of the strippers on rod 40. Shaft 34 may be driven by a sprocket chain 42$^a$ passing over sprocket 43 on shaft 8 and a sprocket 44 upon the end of shaft 34. Shaft 34 is preferably mounted at its ends in bearings 46, adjustable toward or from shaft 8 and locked in position by set screws 47. Chain 42$^a$ may be tensioned by an idler 45.

In the operation of this machine, the fruit may be fed between cylinder 5 and drum 1 by any approved means. The fruit is forced against the teeth 15 by the cylinder 5, and the pulp of the fruit is impaled on the teeth while the seeds are pressed by the ends of the teeth into the yielding surface of cylinder 5. Rotation of the cylinder brings the seeds adhering to the ends of the teeth to knife 29, which strips them from the teeth; the pulp portion of the fruit is carried by the teeth until it reaches fruit strippers 23, which strip it from the teeth, whereupon it falls from the machine into any desired receptacle. Should material accumulate on the seed stripping knife, the disks 35 are adapted to catch it and carry it until it is dislodged therefrom by the part 38 of the strippers 32. The position of the seed stripping knife may be adjusted to or from the drum 1 by moving the bearings 46 of shaft 34 upwardly or downwardly, said bearings being tightened in adjusted position by set screws 47. The position of the knife 29 circumferentially of the drum may be adjusted by moving rod 40 in slots 41 of the frame 2, in combination with the previously described adjustment, to thereby place the disks 35 a greater or less distance from the drum, as may be desired.

While one form of apparatus in which the invention may be embodied has been illustrated and described, it is obvious that various modifications and changes may be made, and the right is reserved to all such modifications and changes as do not depart from the spirit and scope of the invention.

We claim:

1. In a fruit seeder, the combination of a drum comprising a plurality of members each having grooves on its periphery, with a plurality of impaling units adapted to be held in said grooves, each of said units provided with an extended portion on each side thereof abutting contiguous units.

2. In a fruit seeder, an impaling unit comprising a plurality of elements in parallel and joined together to form a block, each of said elements consisting of a thin portion provided with teeth and extensions beyond the end teeth and an integral thicker portion offset from the wall of the thinner portion at a short distance below the bottom of the teeth.

3. In a fruit seeder, an impaling unit comprising a plurality of elements in parallel and joined together to form a block, each of said elements consisting of a thin portion provided with teeth and extensions beyond the end teeth and a thicker portion offset from the side walls of the thinner portion at a short distance below the bottom of the teeth and provided with a dovetail, said offsets and extensions equal in width to substantially one-half of the spaces between the teeth, substantially as described and for the purpose set forth.

4. In a fruit seeder, the combination of a drum, with impaling means thereon, a seed stripping knife having its edge arranged longitudinally of the drum, and means for removing material accumulating on said knife, including a plurality of rotatively mounted toothed disks.

5. In a fruit seeder, the combination of a drum, with impaling means thereon, a seed stripping knife having its edge arranged longitudinally of the drum, said knife adjustable circumferentially of the drum.

6. In a fruit seeder, the combination of a drum, with impaling means thereon, a seed stripping knife having its edge arranged longitudinally of the drum, said knife adjustable circumferentially of the drum, and means for removing material accumulating on said knife.

7. In a fruit seeder, the combination of a drum, with impaling means thereon, a shaft adjacent to said drum, a plurality of toothed disks upon said shaft, strippers associated with said disks, means for adjusting said shaft toward or from said drum, means for adjusting said strippers around the axis of said shaft, and a seed stripping knife carried by said strippers 8. In a fruit seeder, the combination of a drum, with impaling means thereon, a shaft adjacent to said drum, toothed disks alternating with strippers mounted on said shaft, said strippers provided with dovetails, and a stripping knife mounted on said dovetails, substantially as described.

9. In a fruit seeder, the combination of a drum, with impaling means thereon, a shaft mounted adjustably adjacent to said drum, toothed disks alternating with strippers mounted on said shaft, a stripping knife removably carried by said strippers, and means for adjusting said strippers on said shaft.

10. In a raisin seeder, an element for an impaling unit, formed to provide a thin portion having teeth and extensions beyond the end teeth, and a thicker portion offset from the side walls of the thinner portion at a short distance below the bottom of the teeth and provided with a dovetail having an opening therein, said offsets and extensions equal in width to substantially one-half of the spaces between said teeth, substantially as described.

In testimony whereof, we have signed our names to this specification in the presence of two subscribing witnesses at Los Angeles, County of Los Angeles, State of California, this 14th day of May, A. D. 1909.

BASIL H. PAUL.
MADELEINE PAUL.

Witnesses:
LUKE S. ATLAR,
JOHN MURRAY MARSHALL.